(12) United States Patent
Hardy

(10) Patent No.: US 6,556,677 B1
(45) Date of Patent: Apr. 29, 2003

(54) SINGLE-ENDED ECHO CANCELLATION SYSTEM AND METHOD

(76) Inventor: William Christopher Hardy, 8712 Lacrosse Dr., Dallas, TX (US) 75231

(*) Notice: Subject to any disclaimer, the term of this patent is extended or adjusted under 35 U.S.C. 154(b) by 0 days.

(21) Appl. No.: 09/321,269

(22) Filed: May 27, 1999

(51) Int. Cl.[7] .................................................. H04B 3/20
(52) U.S. Cl. .................... 379/406.01; 370/286; 370/294
(58) Field of Search ..................... 379/406.01; 370/294, 370/286, 280

(56) References Cited

U.S. PATENT DOCUMENTS

| | | | | |
|---|---|---|---|---|
| 4,326,287 A | * | 4/1982 | Abramson | .................. 370/276 |
| 4,989,236 A | * | 1/1991 | Myllymaki | ............. 379/406.01 |
| 5,712,848 A | * | 1/1998 | Deutsch | ....................... 370/280 |
| 6,044,268 A | * | 3/2000 | Haartsen | ..................... 455/426 |

* cited by examiner

*Primary Examiner*—Forester W. Isen
*Assistant Examiner*—Daniel Swerdlow

(57) ABSTRACT

A method of for canceling echos at a first end of a telephone call marks every other byte of a first digital representation of a first analog signal originating at the first end of the call with a signature. A second digital representation of a second analog signal from the second end of the call is received at the first end and split into a stream of odd number bytes and a stream of even number bytes. The streams of bytes are analyzed for the presence of the signature and one of the streams of bytes is converted to a third analog signal if the signature is detected.

22 Claims, 3 Drawing Sheets

SINGLE-ENDED ECHO CANCELLATION SYSTEM AND METHOD

BACKGROUND

The present invention relates generally to the field of telephone communications, and more particularly to a method of and system for providing single-ended echo cancellation in telephone calls.

DESCRIPTION OF THE PRIOR ART

When telephone calls began spanning very long distances, echo signals became an annoying problem. Echo signals arise mainly at the hybrid that interfaces the network to a two-wire subscriber loop. The role of the hybrid is to separate incoming and outgoing analog signals. In practice, hybrids cannot perfectly match at all frequencies the varying circuit impedances along the subscriber loop and the receive and transmit ports. Therefore, a small amount of a received signal is retransmitted back to the sender. This causes telephone users to hear their own speech repeated back to them on a delayed basis.

In long distance telephony, this undesirable echo effect has been effectively mitigated by sophisticated echo cancellers that can recognize and adaptively counteract echo signals. More recently, however, echo, problems have re-emerged in the field of mobile telephony. Even on a local call, a digital telephone introduces some absolute delay as it encodes a voice signal. This delay can be comparable to the delays normally observed for long distance calls.

Typical local telephone exchanges do not incorporate echo cancellation because it has been previously thought to be necessary only for long distance traffic. A mobile user will often hear an echo signal depending on the quality of the hybrid circuit at the other end of the conversation.

A technique is required for providing improved echo cancellation, especially for mobile (i.e., cellular, PCS, etc.) phone users, that does not rely upon the traditional echo cancellers built into the interexchange network. This technique is also required for international calls to countries in which domestic long distance phone systems do not offer reliable or effective echo cancellation.

SUMMARY

The present invention provides a method of and system for canceling echos at the first end of a telephone call. The present invention marks every other byte of a first digital representation of a first analog signal originating at the first end of the call with a signature. The invention receives a second digital representation of a second analog signal from the second end of the call and splits the second digital representation into a stream of odd number bytes and a stream of even number bytes. The invention analyzes the streams of bytes for the presence of the signature and converts one of the streams of bytes to a third analog signal if the signature is detected.

Preferably, the invention marks every other byte of the first digital representation with a signature by replacing every other byte of the first digital representation with a fixed value byte. The fixed value byte preferably has a value equal to the maximum value for a byte of the first digital representation. The signature is detected as a fixed offset in one of the streams of bytes received at the first end. If there is an echo, one of the streams of bytes will include an echo of the fixed value byte signature as an offset. The other stream of bytes will include an echo of the first analog signal. By converting the stream of bytes with the offset to an analog signal, the echo is removed.

The present invention converts the first analog signal to the first digital representation by sampling the first analog signal a first sampling rate, which is preferably the conventional 8 KHz sampling rate. The second digital representation is also formed by sampling the second analog signal at the conventional 8 KHz sampling rate. The present invention synchronizes the sampling of the first and second analog signals so that a maximum signature may be detected at the first end.

DESCRIPTION OF THE PREFERRED EMBODIMENT

Figure 1:
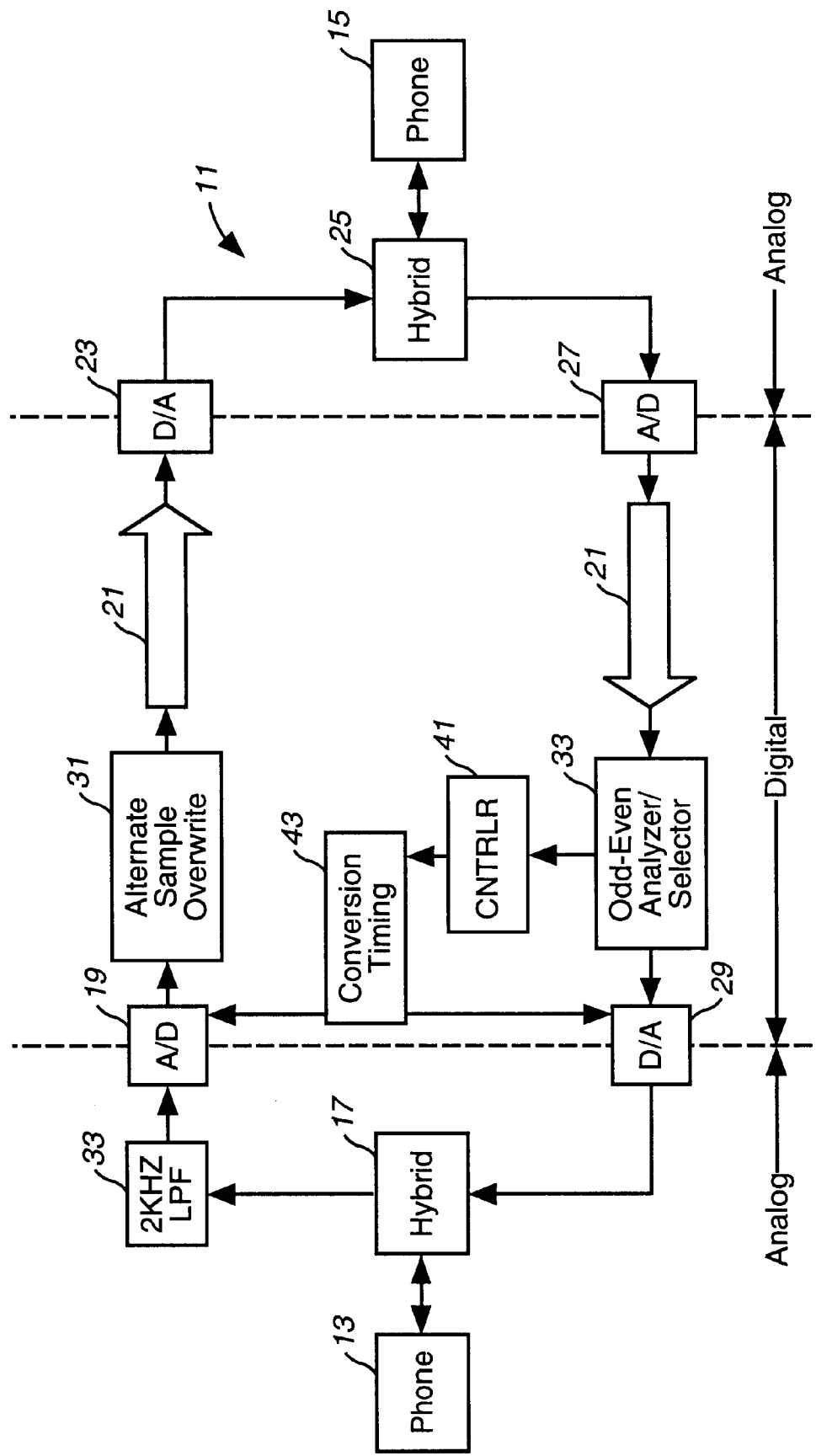
FIG. 1 is a block diagram of a system according to the present invention.

Referring now to the drawings, and first to FIG. 1, a telephone system according to the present invention is designated generally by the numeral 11. System 11 includes a telephone 13 located at an echo controlling end and a telephone 15 located at a remote, non-echo controlled, end. In the Figures, telephones 13 and 15 are both analog telephones connected to traditional subscriber loops. However, the system of the present invention has application to systems in which the telephone at the echo controlling end is a digital phone. Telephone 13 is coupled to a hybrid 17. As is well known to those skilled in the art, hybrid 17 converts from a two-wire transmission line to a four-wire transmission line. Hybrid 17 is coupled to an analog to digital (A/D) converter 19. A/D converter 19 samples the analog signal received from hybrid 17 at the conventional 8 Khz sampling rate to convert the analog signal from telephone 13 to a digital signal. The digital signal from A/D converter 19 is transported in the digital domain across the network, indicated generally at 21 to a digital to analog (D/A) converter 23 located at the remote, non-echo controlled, end. Digital analog converter 23 converts the digital signal to an analog signal, which is coupled to a hybrid 25. Hybrid 25 is coupled to telephone 15, which receives the analog signal from telephone 13.

Telephone 15 transmits voice signals across network 21 back to telephone 13. The analog voice signals from telephone 15 are coupled to hybrid 25, which in turn is coupled to an A/D converter 27. A/D converter 27 converts the analog signals received from hybrid 25 to digital signals, which are transmitted across network 21 in the digital domain to a D/A converter 29 located at the echo controlling end. D/A converter 29 is coupled to hybrid 17, which in turn is coupled to telephone 13.

Echos are caused by impedance mismatches at hybrid 25. A portion of the analog signal from telephone 13 received on the inbound leg at hybrid 25 may be coupled back onto the outbound leg. Because of signal processing and transmission delays, any incoming signal that is coupled through hybrid 25 is received back at telephone 13 delayed in time as an echo. This echo is annoying and objectionable.

The present invention achieves echo cancellation by performing signal processing in the digital domain. The digital signal received from A/D converter 19 is processed by an alternate sample overwrite unit 31. The digital signal from A/D converter 19 is a stream of eight bit bytes with values ranging from −255 to +255. Alternate sample overwrite unit 31 replaces every other byte of the digital signal with a fixed value signature byte, which in the preferred embodiment has a value of +255. Alternate sample overwrite unit effectively imposes a 4 KHz high amplitude signal on top of the analog signal received at telephone 13. The high amplitude 4 KHz signal is offset from zero. Overwriting alternate samples of the digital signal has the effect of cutting in half the effective sampling rate of the analog signal received at telephone 13. Accordingly, in the preferred embodiment, a 2 KHz low pass filter 33 is coupled between hybrid 17 and A/D converter 19 to prevent aliasing.

The overwritten digital signal produced by alternate sample overwrite unit 31 is transported across network 21 to D/A converter 23 where it is converted to the analog domain. The pass band of the subscriber loop to telephone 15 is 300–3,000 Hertz. Accordingly, the 4 KHz signal produced by alternate sample overwrite unit 31 is not perceived at telephone 15. However, if there is an echo, a portion of the signal from the echo controlled end, including the 4 KHz high amplitude signal, will be coupled across hybrid 25. Voice signals to telephone 15 will be combined with the echo signal at hybrid 25.

Figure 2:
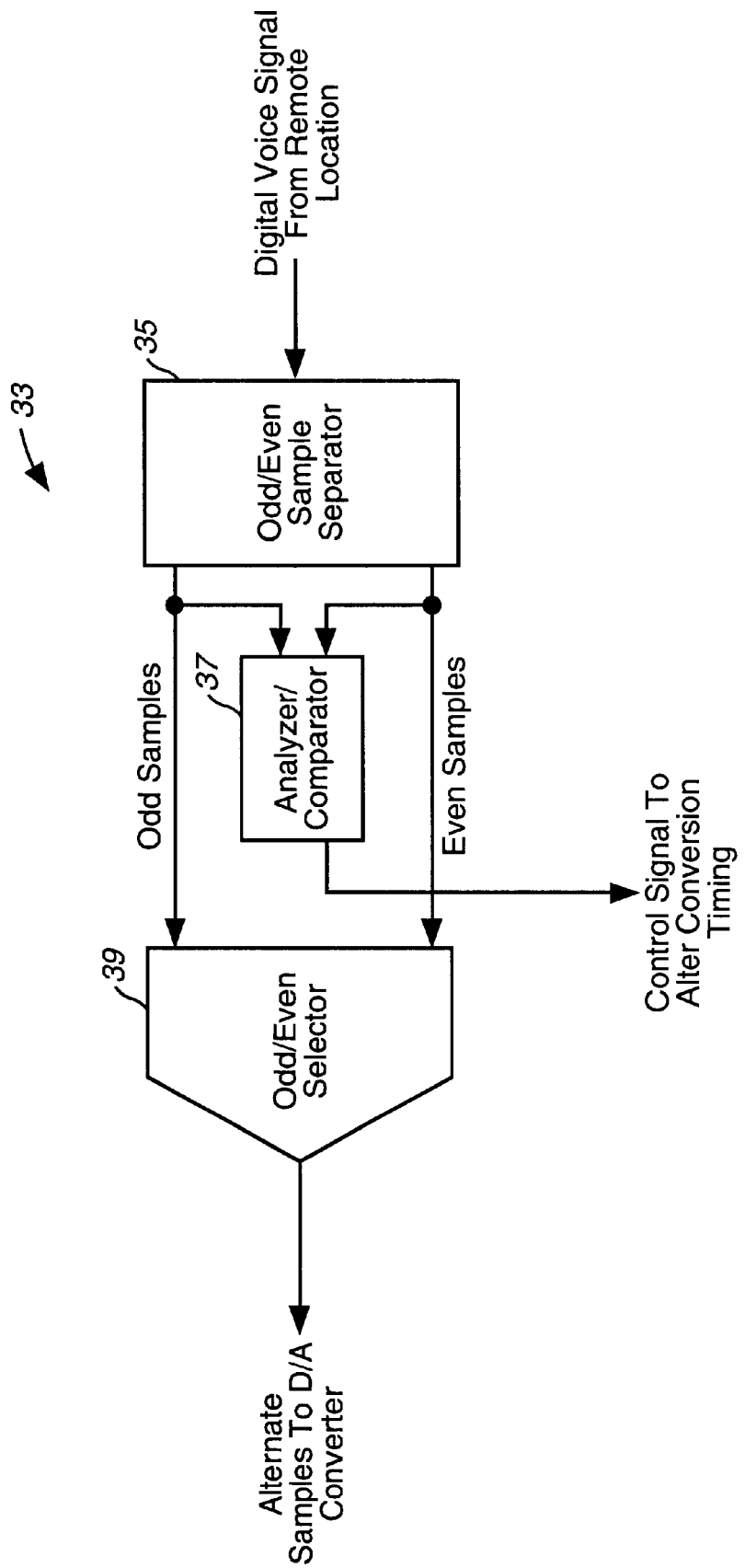
FIG. 2 is a block diagram of the odd-even analyzer/selector of FIG. 1.

The analog signal, which may include an echo, is converted to the digital domain at A/D converter 27. According to the present invention, the digital signal from A/D converter 27 is transported across network 21 to an odd-even analyzer/selector unit 33. Referring now to FIG. 2, odd-even analyzer/selector 33 includes an odd/even sample separator 35. Odd/even sample separator 35 splits the digital voice signal received from the remote location into a stream of odd number bytes and a stream of even number bytes. The streams of odd and even numbered bytes are coupled to an analyzer comparator 37.

Analyzer/comparator 37 analyzes the streams of odd and even bytes to detect the signature produced by alternate sample overwrite unit 31 (FIG. 1). During periods of silence, the signature will be detected as a dc signal. At times other than silence, the signature will be detected as a dc offset in one of the streams of bytes.

Odd-even analyzer/selector 33 includes an odd/even selector 39 that is coupled to odd/even sample separator 35 and to analyzer/comparator 37. If analyzer/comparator 37 detects the signature, then it signals odd/even selector 39 to select the stream of bytes with the signature and discard the other stream of bytes. Odd/even selector 39 outputs alternate samples to D/A converter 29 of FIG. 1. If no signature is detected, then analyzer/comparator 37 signals odd/even selector 39 to recombine the byte streams.

In order to maximize the signature received in the event of an echo, the present invention synchronizes the timing of the conversion performed at A/D converter 19 with the conversion performed by A/D converter 27. Analyzer comparator 37 produces a control signal, which is received at a controller 41 of FIG. 1. Controller 41 outputs a signal to alter the conversion timing of A/D converter 19, as indicated at 43. If odd-even analyzer/selector 33 detects an echo, the timing of A/D converter 19 is adaptively altered so that a maximum signature is detected at odd-even analyzer/selector 33.

In the event an echo signature is detected, odd-even analyzer/selector 33 selects only every other byte of the digital signal from the remote, non-echo controlled, end for D/A conversion. Therefore, odd-even analyzer/selector 33 effectively cuts the sampling rate in half. Accordingly, when an echo signature is detected, controller 41 signals D/A converter 29 to convert the digital signal back to the analog domain at a conversion rate of 4 KHz. If no echo signature is detected, controller 41 signals D/A converter 29 to convert the digital signal back to the analog domain at a conversion rate of 8 KHz.

Figure 3:
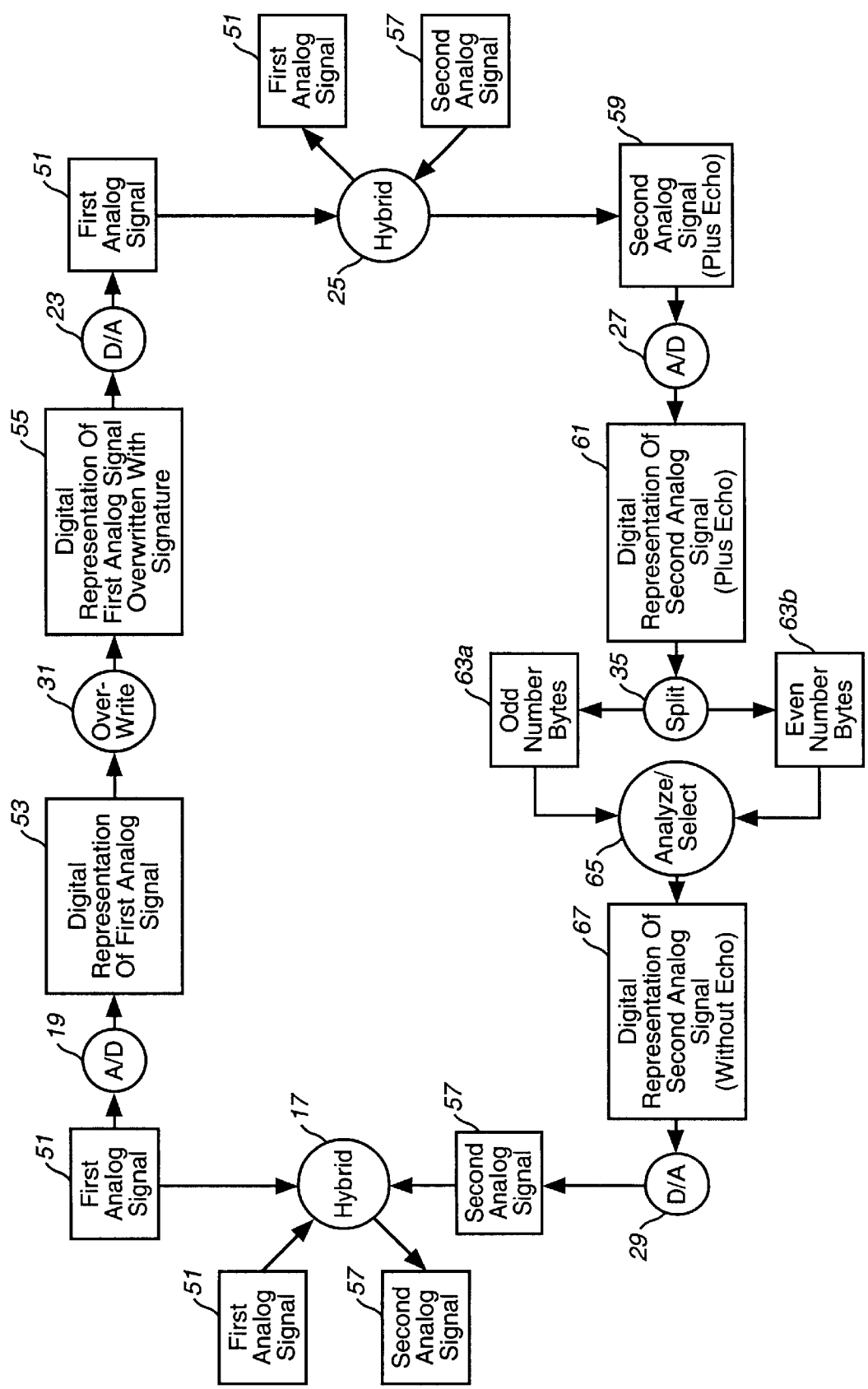
FIG. 3 is a block diagram illustrating the signal processing according to the present invention.

The signal processing according to the present invention may be summarized with reference to FIG. 3. A first analog signal 51 is received at hybrid 17. First analog signal 51 from hybrid 17 is converted to a digital representation of the first analog signal, indicated at 53 by A/D converter 19. Digital representation 53 of first analog signal 51 is overwritten by alternate sample overwrite unit 31 to form a digital representation a first analog signal that is overwritten with the signature, indicated at 55. Digital representation 55 is converted to the analog domain by D/A converter 23 to retrieve first analog signal 51.

If there is an echo, first analog signal 51 is coupled to a second analog signal 57 at hybrid 25. To form a second analog signal (plus echo), indicated at 59. Second analog signal 59 is converted to a digital representation of second analog signal (plus echo), as indicated at 61. Digital representation 61 is split by odd/even sample separator 35 into a stream of odd numbered bytes 63a and a stream of even numbered bytes 63b. Byte streams 63a and 63b are analyzed and selected, as indicated at 65 to form a digital representation of the second analog signal without the echo, as indicated at 67. Digital representation 67 is converted to the analog domain by D/A converter 29 thereby to retrieve second analog signal 57.

From the foregoing, it may be seen that the system of the present invention provides single ended echo cancellation. While the present invention has been described and illustrated with reference to a presently preferred embodiment, those skilled in the art will recognize alternative embodiments, given the benefit of the foregoing disclosure. Accordingly, the spirit and scope of the invention shall be determined with reference to the claims.

What is claimed is:

1. A method of canceling echos in a telephone call, the telephone call having a first end and a second end, which comprises the steps of:

marking every other byte of a first digital representation of a first analog signal originating at the first end with a signature;

receiving at the first end a second digital representation of a second analog signal from the second end;

splitting the second digital representation of the second analog signal received at the first end into a stream of odd number bytes and a stream of even number bytes; and analyzing the streams of bytes for the presence of the signature.

2. The method as claimed in claim 1, comprising the step of converting one of the streams of bytes to a third analog signal based upon detecting the signature in one of the streams of bytes.

3. The method as claimed in claim 1, comprising the steps of:

recombining the streams of bytes if the signature is not detected in either of the streams of bytes; and converting the recombined streams of bytes to a third analog signal.

4. The method as claimed in claim 1, wherein the step of marking every other byte of the first digital representation of the first analog signal originating at the first end with a signature comprises the step of replacing every other byte of the first digital representation with a fixed value byte.

5. The method as claimed in claim 4, wherein the fixed value byte has a value equal to the maximum value for a byte of the first digital representation.

6. The method as claimed in claim 4, wherein the step of analyzing the streams of bytes for the presence of the signature comprises the step of determining one of the streams of bytes has a fixed offset.

7. The method as claimed in claim 6, comprising the step of converting the stream of bytes with the fixed offset to an analog signal.

8. The method as claimed in claim 1, comprising the step of converting the first analog signal to the first digital representation.

9. The method as claimed in claim 8, wherein the step of converting the first analog signal to the first digital representation comprises the step of sampling the first analog signal at a first sampling rate.

10. The method as claimed in claim 9, comprising the step of filtering the first analog signal to remove frequencies greater than substantially one-quarter of the first sampling rate.

11. The method as claimed in claim 9, comprising the step of converting the second analog signal to the second digital representation.

12. The method as claimed in claim 11, wherein the step of converting the second analog signal to the second digital representation comprises the step of sampling the second analog signal at the first sampling rate.

13. The method as claimed in claim 12, comprising the step of synchronizing the sampling of the first and second analog signals so that a maximum signature may be detected at the first end.

14. The method as claimed in claim 12, comprising the step of converting one of the streams of bytes to a third analog signal based upon detecting the signature in one of the streams of bytes at a rate substantially equal to half the first sampling rate.

15. A method of canceling echos in a telephone call between a first end and a second end, which comprises the steps of:
   converting a first analog signal to a first digital signal at the first end, the first digital signal including a serial string of bytes;
   replacing every other byte of the serial string of bytes with a fixed value byte, thereby converting the first digital signal into a second digital signal;
   transmitting the second digital signal from the first end to the second end;
   converting the second digital signal to a second analog signal at the second end;
   converting a third analog signal to a third digital signal at the second end, the third digital signal comprising a serial stream of bytes;
   transmitting the third digital signal from the second end to the first end;
   splitting the third digital signal into a stream of even number bytes and a stream of odd number bytes at the first end; and
   determining if one of the streams of bytes has a fixed offset.

16. The method as claimed in claim 15, comprising the step of if one of the streams of bytes has a fixed offset, converting the stream of bytes with the fixed offset to a fourth analog signal at the first end.

17. The method as claimed in claim 15, including the steps of:
   if neither of the streams of bytes has a fixed offset, recombining the streams of bytes; and
   converting the recombined stream of bytes to a fourth analog signal at the first end.

18. The method as claimed in claim 15, including the step of synchronizing the conversions of the first and third analog signals so that a maximum offset may be detected at the first end.

19. A system for canceling echos in a telephone call between a first end and a second end, which comprises:
   a first analog-to-digital converter at the first end for converting an analog signal from the first end to a stream of bytes;
   a unit coupled to the first analog-to-digital converter for replacing every other byte of the stream of bytes with a fixed value byte;
   a first digital-to-analog converter at the second end coupled to the unit for converting a stream of bytes received from the first end to an analog signal;
   a second analog-to-digital at the second end converter for converting an analog signal from the second end to a stream of bytes;
   a second unit coupled to the second analog-to-digital converter for separating a stream of bytes received at the first end into a sub-stream of even number bytes and a sub-stream of odd number bytes; and
   a third unit coupled to the second unit for determining if the bytes of either of the sub-streams have a fixed offset.

20. The system as claimed in claim 19, further comprising:
   means for selecting a sub-stream having a fixed offset for digital-to-analog conversion; and
   a second digital-to-analog converter coupled to the selecting means for converting the selected sub-stream to an analog signal.

21. The system as claimed in claim 20, comprising a timing controller for controlling the conversion rate of the second digital-to-analog converter.

22. The system as claimed in claim 19, further comprising:
   means for recombining the sub-streams if neither of the substreams has a fixed offset; and
   a second digital-to-analog converter coupled to the selecting means for converting the recombined sub-streams to an analog signal.

* * * * *